June 21, 1927.
H. LEGENDRE
1,632,978
SIGNAL DEVICE FOR MOTOR VEHICLES
Filed Feb. 26, 1926     2 Sheets-Sheet 1
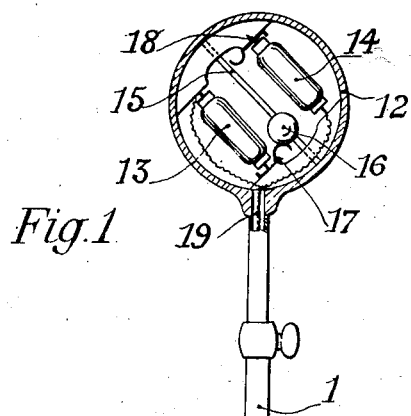
Fig.1
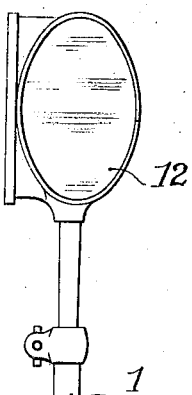
Fig.2
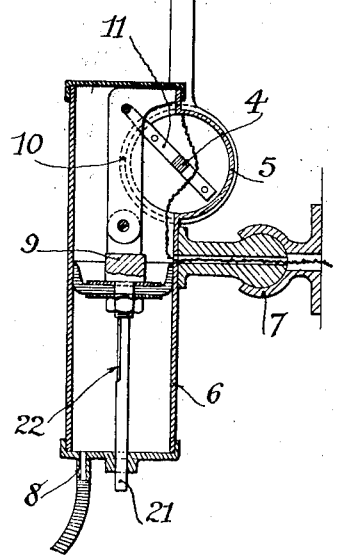
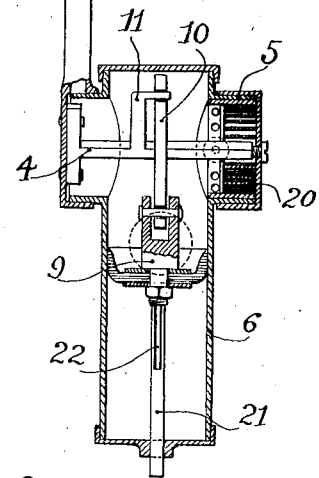
Fig.3
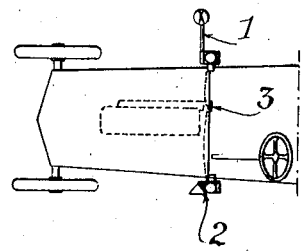
H. Legendre
INVENTOR
By: Marks & Clerk
Attys June 21, 1927.
H. LEGENDRE
1,632,978
SIGNAL DEVICE FOR MOTOR VEHICLES
Filed Feb. 26, 1926    2 Sheets-Sheet 2
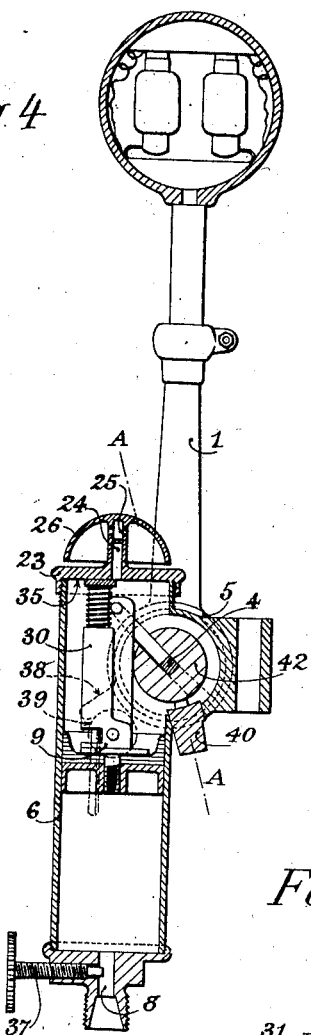
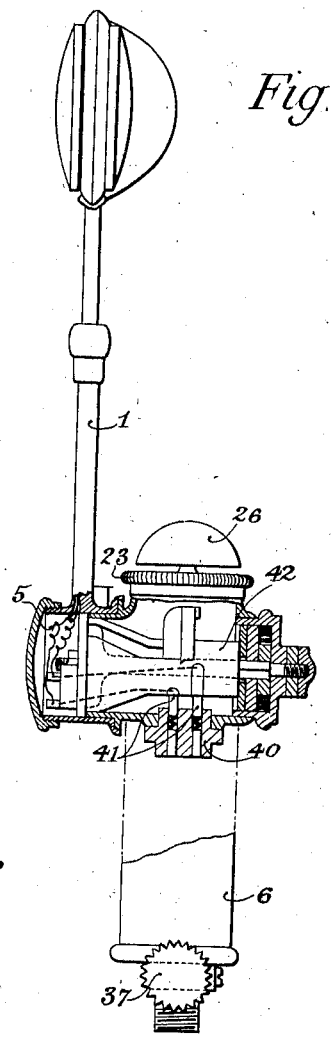
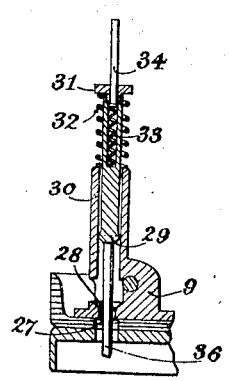
H. Legendre
INVENTOR
By: Marks & Clark
ATTYS Patented June 21, 1927.

1,632,978

UNITED STATES PATENT OFFICE.

HENRI LEGENDRE, OF PARIS, FRANCE.

SIGNAL DEVICE FOR MOTOR VEHICLES.

Application filed February 26, 1926, Serial No. 90,989, and in Germany August 25, 1925.

My invention relates to a signal device for motor vehicles whereby the driver is enabled to show to the vehicles in the rear the direction he intends to take, of his intention to stop.

The said signal device comprises two pivoted arms which are mounted on the respective sides of the vehicle and are controlled by the power of the engine suction in such manner as to pivot into the horizontal position at the sides of the vehicles. The said arms carry lanterns which may be suitably lighted and will show different colors according to their position.

The appended drawings show by way of example two embodiments of the invention.

Fig. 1 is a plan view of the front part of the vehicle which is provided with the two side signals.

Figs. 2 and 3 are two vertical sections of a signal device.

Figs. 4 to 6 show another embodiment.

Fig. 4 is a vertical section of the device.

Fig. 5 is a partial section on the line 5—5 of Fig. 4.

Fig. 6 is a sectional view showing details of the piston.

The arrangement shown in Fig. 1 comprises two pivoted arms 1 and 2 disposed upon the sides of the vehicle. The said arms are lowered at the exterior by the suction of the engine, against the action of the antagonistic springs tending to straighten the device. By the use of the three-way cock 3, the driver can bring one of the said arms into the horizontal position to show that he intends to turn to the right or left, or he may bring down both arms to show that he means to stop. The said arms will remain in the vertical position during the normal travel of the vehicle.

Each arm is mounted on a horizontal axle 4 journaled in a drum 5 secured to a cylinder 6 which is mounted on a ball-bearing support 7 secured to the vehicle body. By means of the ball-bearing I am enabled to suitably regulate the position of the apparatus to correspond to the various types of vehicles.

The cylinder 6 communicates through a pipe 8 with the engine suction; said cylinder coacts with a piston 9 which is pivoted by means of a link 10 to a crank 11 mounted on the shaft 4.

When the cock 3 is in the proper position, there is produced, through the conduit 8, a vacuum under the piston 9, so that the piston will descend, thus rotating the shaft 4 and bringing the arm 1 into the horizontal position.

The said arm preferably consists of two telescoping parts, as shown in the drawings, whereby its length may be regulated according to circumstances. Upon the said rod is mounted a lantern 12, which may have, for instance, a triangular shape; said frame contains one or more lamps which are arranged for automatic lighting.

In the present example there are two lamps 13 and 14, comprising a white lamp which is lighted when the arm is in the vertical position, and a colored lamp, red or green, which is lighted when the arm is in the horizontal position. For this purpose the lantern 12 is provided with a rod 15 having slidable thereon a ball 16 and which is electrically grounded upon the metallic parts.

The said ball may take contact alternately with the two insulated contact pieces 17 and 18, each of which is connected with one of the terminals of a lamp, the other terminals being each connected to a conductor 19 supplying the current which is brought into the said arm and its support so as to be entirely protected against the rain.

The rod 15 is inclined at 45 degrees relatively to the said arm, so that when the arm is pivoted about, the said ball will be caused to slide, thus alternately grounding each lamp circuit by means of the said ball. In this manner the white lamp 13 will be lighted in the vertical position of the said rod, thus forming a lantern signal. When the arm is lowered, the red or green lamp 14 will now be lighted.

Obviously, I may employ but a single lamp which will be lighted in the horizontal position of the rod.

Each arm is brought into this vertical position by the spring 20 surrounding the drum 5 and attached at one end to the shaft 4 and at the other end to the said drum.

To make the signal more visible, the device may be so arranged that the said arms are given an oscillating motion when near the horizontal position, instead of remaining stationary.

For this purpose, the piston 9 may be extended by a rod 21 slidable through the end of the cylinder 6 and slotted at 22 adjacent the said piston, so that at the end of the piston stroke, a certain amount of air will be admitted which will momentarily suppress the vacuum below the piston so that it can ascend to a certain degree. As the suction continues, the piston again descends, thus imparting a series of oscillations to the arm.

Obviously, I may employ any other suitable means for the admission of air when the piston is at the end of its stroke, for instance a slide valve, a clack valve, or the like.

The aforesaid automatic lighting and extinguishing device may be obviously replaced by any other suitable means for attaining the desired result, and depending upon the raising or lowering of the said arm.

I may employ the device shown in Figs. 4 to 6, which affords a most reliable operation. The cylinder 6 is closed at the top by a screw cap 23 providing for the admission of air but preventing all entrance of water. For this purpose, to the said cap is secured a pipe 24 apertured at the top at 25 and protected by a tapered cap 26. In the piston 9 is formed an aperture 27 comprising at the top a recess 28 which serves as a seat for the clack valve 29; said valve is guided in a socket 30 secured to the piston 9, and comprises the screw plug 31. The spring 32 is interposed between the said plug and the socket 30.

Within the said clack valve is mounted a second spring 33 upon which is caused to bear the rod 34 which makes contact with the cap 23. To prevent all noise, the said cap is provided at the lower part with a leather or like washer 35. On the clack valve is mounted the downwardly extending rod 36 which is guided in the aperture 27.

The operation is as follows:—

The piston 9 being in the upper position, the clack valve 29 is pressed upon its seat 28 due to the action of the cap 23 upon the rod 34. When suction takes place below the piston 9, the clack valve 29 is pressed upon its seat according as the suction or vacuum increases, and all circulation of air through the orifice 27 is cut off.

When the piston 9 descends to a sufficient degree, the end of the rod 36 makes contact with the end of the cylinder 6 and the valve 29 is thus lifted, affording an admission of air, so that the piston 9 will rise under the action of the antagonistic spring. The valve 29 then closes, the piston descends, and the cycle of operations thus continues as long as the driver opens the suction.

To regulate the degree of the suction, I provide a throttling screw 37 in the conduit 8 between the apparatus and the engine.

To obviate all shocks, I prefer to employ a nib 38 upon the arm 1 which abuts, when the arm is lowered, against a rubber disk 39 for instance, which is mounted on the cylinder 6.

In order to supply current to the lamps, I provide a contact device 40 upon the drum 42 comprising for instance two spring-mounted carbon brushes 41. Upon the shaft 4 is mounted an insulating cylinder of ebonite or the like carrying contact pieces coacting with the said brushes and connected by wires passing through the insulation to two terminals to which are connected the wires leading—through the arms—to the lamps of the apparatus.

The arm is preferably provided with a white and a green lamp. The cylinder contact corresponding to the white lamp is made narrow so as to light this lamp only when the arm is in the vertical position and serves as a lantern. But the contact piece corresponding to the green lamp has a certain length, so that the green lamp will be lighted during the whole movement of the arm and as soon as the arm begins to take the inclined position.

Having thus described my apparatus, what I claim as new therein, and my own invention, is:

1. A signal device for motor vehicles comprising at one side of the vehicle a pivoting arm, a crank rigidly connected with the said arm, a spring upwardly urging the said arm into the vertical position, a link pivoted at one end to the said crank, a cylinder, a piston mounted in this cylinder and pivoted to the other end of the said link, a conduit connecting this cylinder with the intake of the motor, a valve device mounted on the said conduit and controlled by the driver and means allowing the external air to enter the cylinder every time the piston reaches the end of its stroke.

2. A signal device for motor vehicles comprising at one side of the vehicle a pivoting arm, a crank rigidly connected with the said arm, a spring upwardly urging the said arm into the vertical position, a link pivoted at one end to the said crank, a cylinder, a piston mounted in this cylinder and pivoted to the other end of the link, a conduit connecting this cylinder with the intake of the motor, a valve device mounted on the said conduit and controlled by the driver, a clack valve adapted to close an orifice in the piston, and means for lifting said valve when the said piston is near the lower end of its stroke.

3. A signal device for motor vehicles comprising at one side of the vehicle a pivoting arm, a crank rigidly connected with the said arm, a spring upwardly urging the said arm into the vertical position, a link pivoted at one end to the said link, a cylinder, a piston mounted in this cylinder and pivoted to the other end of the link, a conduit connecting this cylinder with the intake of the motor, a valve device mounted on this conduit and adapted to be controlled by the driver and a clack valve adapted to close an orifice in the piston, the said valve having an extension passing through the said piston and projecting from its bottom.

4. A signal device for motor vehicles comprising at one side of the vehicle, a pivoting arm, a crank rigidly connected with the said arm, a spring upwardly urging the arm into the vertical position, a link pivoted at one end to the said link, a cylinder, a piston mounted in this cylinder and pivoted to the other end of the said link, a conduit connecting this cylinder with the intake of the motor, a valve device mounted on the said conduit and controlled by the driver, a perforated plug disposed on the upper orifice of the cylinder, a clack valve adapted to close an orifice in the said piston, this clack valve having an extension passing through the said piston and projecting from its bottom, a rod capable of sliding in the clack valve and adapted to bear against the said plug, a spring adapted to lift the said rod relatively to the clack valve and a second spring adapted to lift the clack valve relatively to the piston.

In testimony whereof I have hereunto affixed my signature.

HENRI LEGENDRE.